(12) United States Patent
Zhang

(10) Patent No.: US 9,017,447 B2
(45) Date of Patent: Apr. 28, 2015

(54) NANOWIRE PREPARATION METHODS, COMPOSITIONS, AND ARTICLES

(75) Inventor: Junping Zhang, Saint Paul, MN (US)

(73) Assignee: Carestream Health, Inc., Rochester, NY (US)

( * ) Notice: Subject to any disclaimer, the term of this patent is extended or adjusted under 35 U.S.C. 154(b) by 515 days.

(21) Appl. No.: 13/432,027

(22) Filed: Mar. 28, 2012

(65) Prior Publication Data

US 2012/0301741 A1    Nov. 29, 2012

Related U.S. Application Data

(60) Provisional application No. 61/488,828, filed on May 23, 2011.

(51) Int. Cl.
| | | |
|---|---|---|
| *B22F 9/24* | (2006.01) | |
| *B22F 1/00* | (2006.01) | |
| *B82Y 30/00* | (2011.01) | |

(52) U.S. Cl.
CPC ....... *B22F 1/0025* (2013.01); *Y10T 428/12431* (2015.01); *B22F 1/0018* (2013.01); *B22F 9/24* (2013.01); *B82Y 30/00* (2013.01)

(58) Field of Classification Search
CPC ......... B22F 9/24; B22F 1/0018; B22F 1/0025
USPC .......................................................... 75/343
See application file for complete search history.

(56) References Cited

U.S. PATENT DOCUMENTS

2009/0297388 A1*  12/2009  Xia et al. ................ 420/463

FOREIGN PATENT DOCUMENTS

JP    2009-155674    7/2009

OTHER PUBLICATIONS

Johnson, C., Dujardin, E., Davis, S., Murphy, C., and Mann, S. "Growth and form of gold nanorods prepared by seed0mediated, surfactant-directed synthesis". J. Mater. Chem., 2002. 12. 1765-1770.*
Benjamin J. Wiley et al., Synthesis and Electrical Characterization of Silver Nanobeams, Nano Letters, 2006, vol. 6, No. 10, pp. 2273-2278.
Jingyi Chen et al., One-Dimensional Nanostructures of Metals : Large-Scale Synthesis and Some Potential Applications, American Chemical Society, Langmuir, 2007, vol. 23, pp. 4120-4129.
Benjamin J. Wiley et al., Right Bipyramids of Silver: A New Shape Derived from Single Twinned Seeds, Nano Letters, 2006, vol. 6, No. 4, pp. 765-768.
International Search Report, International Application No. PCT/US2012/031050, dated Nov. 28, 2012, 2 pages.
Younan Xia, et al., "Shape-Controlled Synthesis of Metal Nanocrystals: Simple Chemistry Meets Complex Physics?," Angew. Chem. Int. Ed., 2009, 48, pp. 60-103.
Jinting Jiu, et al., "Preparation of Ag nanorods with high yield by polyol process," Materials Chemistry and Physics, 2009, 114, pp. 333-338.

(Continued)

*Primary Examiner* — George Wyszomierski
*Assistant Examiner* — Tima M McGuthry Banks
(74) *Attorney, Agent, or Firm* — Reed L. Christiansen

(57) ABSTRACT

Methods of preparing nanowires having small diameters and large lengths are disclosed. Such nanowires are useful in electronics applications.

7 Claims, 1 Drawing Sheet

(56) References Cited

OTHER PUBLICATIONS

Benjamin Wiley, et al., "Polyol Synthesis of Silver Nanoparticles: Use of Chloride and Oxygen to Promote the Formation of Single-Crystal, Truncated Cubes and Tetrahedrons," Nano Letters, 2004, 4 (9), pp. 1733-1739.

Kylee E. Korte, et al., "Rapid synthesis of silver nanowires through a CuCl- or $CuCl_2$-mediated polyol process," J. Mater. Chem., 2008, 18, pp. 437-441.

Srichandana Nandikonda, "Microwave Assisted Synthesis of Silver Nanorods," M.S. Thesis, Auburn University, Auburn, Alabama, Aug. 9, 2010, 59 pages.

Dapeng Chen, et al., "Large-scale synthesis of silver nanowires via a solvothermal method," J. Mater Sci., Mater Electron, 2011, 22, pp. 6-13.

Liangbing Hu, et al., "Scalable Coating and Properties of Transparent, Flexible, Silver Nanowire Electrodes," ACS Nano, 2010, 4 (5), pp. 2955-2963.

Chang Chen, et al., "Study on the synthesis of silver nanowires with adjustable diameters through the polyol process," Nanotechnology, 2006, 17, pp. 3933-3938.

Li Zhou, et al., "Crystal structure and optical properties of silver nanorings," Applied Physics Letters, 2009, 94, 153102, 3 pages.

Pierre-Yves Silvert, et al., "Preparation of colloidal silver dispersions by the polyol process Part 1—Synthesis and characterization," J. Mater. Chem., 1996, 6 (4), pp. 573-577.

Pierre-Yves Silvert, et al., "Preparation of colloidal silver dispersions by the polyol process Part 2—Mechanism of particle formation," J. Mater. Chem., 1997, 7 (2), pp. 293-299.

Benjamin Wiley, et al., "Shape-Controlled Synthesis of Metal Nanostructures: The Case of Silver," Chem. Eur. J., 2005, 11, pp. 454-463.

Yugang Sun, et al., "Polyol Synthesis of Uniform Silver Nanowires: A Plausible Growth Mechanism and the Supporting Evidence," Nano Letters, 2003, 3 (7), pp. 955-960.

* cited by examiner

NANOWIRE PREPARATION METHODS, COMPOSITIONS, AND ARTICLES

CROSS REFERENCE TO RELATED APPLICATIONS

This application claims the benefit of U.S. Provisional Application No. 61/488,828, filed May 23, 2011, entitled NANOWIRE PREPARATION METHODS, COMPOSITIONS, AND ARTICLES, which is hereby incorporated by reference in its entirety.

BACKGROUND

The general preparation of silver nanowires (10-200 aspect ratio) from silver ions is known. See, for example, Y. Xia, Y. Xiong, B. Lim, S. E. Skrabalak, *Angew. Chem. Int. Ed.* 2009, 48, 60, and J. Jiu, K. Murai, D. Kim, K. Kim, K. Suganuma, *Mat. Chem. & Phys.,* 2009, 114, 333, both of which are hereby incorporated by reference in their entirety. Such preparation methods have typically been carried out in the presence of metal chlorides, such as chlorides of iron (II), iron (III), copper (I), copper (III), and the like. The nanowires produced in the presence of metal chlorides are often too thick for many commercial applications.

When iron or copper are used, they are typically provided as the metal halide salts $FeCl_2$ or $CuCl_2$. See, for example, B. Wiley et al., *Nano Letters,* 2004, 4, 1733-1739 and K. E. Korte et al., *J. Mats. Chem.,* 2008, 18, 437. Other metal halide salts have been used in nanowire synthesis. See, for example, J. Jiu, K. Murai, D. Kim, K. Kim, K. Suganuma, *Mat. Chem. & Phys.,* 2009, 114, 333, which refers to NaCl, $CoCl_2$, $CuCl_2$, $NiCl_2$ and $ZnCl_2$, and S. Nandikonda, "Microwave Assisted Synthesis of Silver Nanorods," M. S. Thesis, Auburn University, Auburn, Ala., USA, Aug. 9, 2010, which refers to NaCl, KCl, $MgCl_2$, $CaCl_2$, $MnCl_2$, $CuCl_2$, and $FeCl_3$. Japanese patent application publication 2009-155674 discloses $SnCl_4$.

Use of KBr has been disclosed in, for example, D. Chen et al., *J. Mater. Sci.: Mater. Electron.,* 2011, L. Hu et al., *ACS Nano,* 2010, 4(5), 2955-2963, C. Chen et al, *Nanotechnology,* 2006, 17, 3933. Use of NaBr has been disclosed in, for example, L. Zhou et al., *Appl. Phys. Letters,* 2009, 94, 153102.

SUMMARY

At least a first method comprises providing at least one composition comprising at least one seed particle and at least one compound capable of forming at least one bromide ion; and reducing at least one first metal ion to at least one first metal nanowire in the presence of the at least one seed particle and in the presence of either the at least one compound or the at least one bromide ion, where at least about 75 percent of the seed particles are multiply-twinned and where the at least one composition comprises at least one of a coinage metal atom or an element from IUPAC Group 11. In at least some embodiments, the reducing the at least one first metal ion to the at least one first metal nanowire occurs in the presence of the at least one compound capable of forming the at least one bromide ion.

In at least some cases, the at least one first metal ion comprises at least one of a coinage metal ion or an ion from IUPAC Group 11 or an ion of silver.

In at least some cases, the at least one seed particle comprises at least one of a coinage metal atom or an element from IUPAC Group 11 or a silver atom.

In at least some cases, the at least one compound comprises at least one of an element from IUPAC Group 1 or a potassium atom or potassium bromide.

Other embodiments provide the one first metal nanowire produced according to any of these methods.

In at least some cases, the at least one first metal nanowire comprises a length greater than about 30 micrometers, or a length of about 40 micrometers.

In at least some cases, the at least one first metal nanowire comprises a width of less than about 40 nm, or a width of about 33 nanometers.

At least a second embodiment provides methods comprising providing at least one first composition comprising at least one first reducible metal ion; and reducing the at least one first metal ion to at least one first metal in the presence of at least one second composition comprising seed particles and at least one compound capable of forming at least one bromide ion, where at least about 75 percent of the seed particles are multiply-twinned.

In such methods, the at least one first reducible metal ion may, for example, comprise at least one coinage metal ion, or at least one ion from IUPAC Group 11, such as, for example, at least one silver ion. The at least one first composition may, for example, comprise silver nitrate.

In such methods, the at least one second composition may, for example, comprise at least one coinage metal or coinage metal ion, or at least one element from IUPAC Group 11, such as, for example, silver or at least one silver ion.

In such methods, the at least one compound may, for example, comprise at least one element from IUPAC Group 1, such as, for example, potassium. The at least one compound may, for example, comprise potassium bromide.

Other embodiments provide the at least one first metal product produced according to such methods. In some cases, the at least one first metal product may comprise at least one metal nanowire, such as, for example, at least one silver nanowire. Such metal nanowires may, in some cases, comprise a length greater than about 30 micrometers, such as, for example, a length of about 40 micrometers. Such metal nanowires may, in some cases, comprise a width of less than about 60 nm, or a width of less than about 40 nm, such as, for example, a width of about 33 nm. Such metal nanowires may, in some cases, comprise an aspect ratio greater than about 500, or an aspect ratio greater than about 1000 such as, for example, an aspect ratio of about 1200.

These embodiments and other variations and modifications may be better understood from the description, exemplary embodiments, examples, and claims that follow. Any embodiments provided are given only by way of illustrative example. Other desirable objectives and advantages inherently achieved may occur or become apparent to those skilled in the art. The invention is defined by the appended claims.

DESCRIPTION

Figure 1:
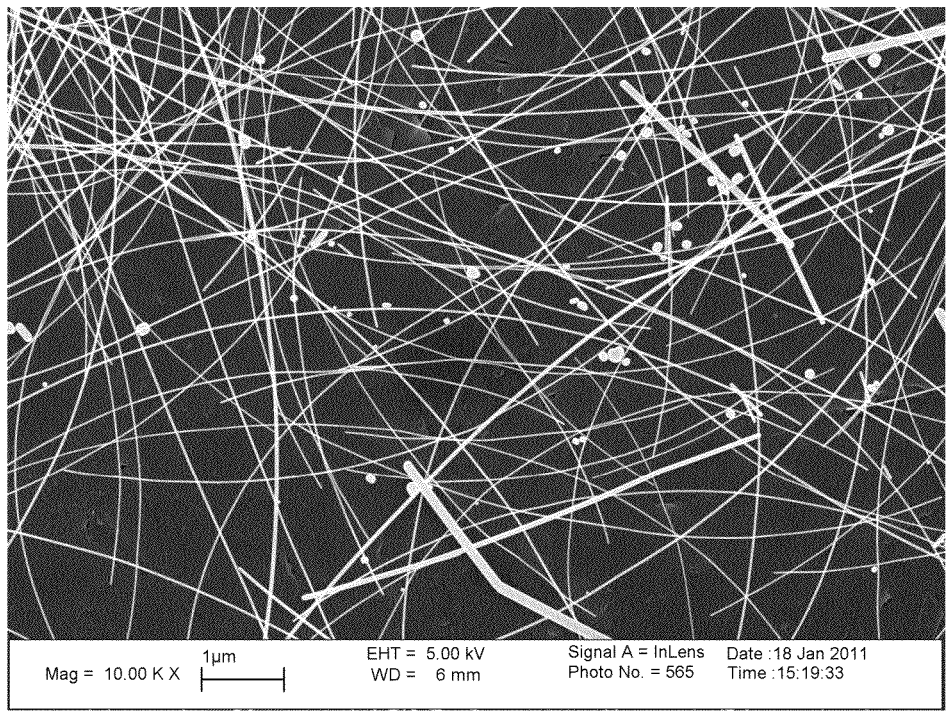
FIG. 1 shows a scanning electron micrograph of the product of Example 1.

All publications, patents, and patent documents referred to in this document are incorporated by reference herein in their entirety, as though individually incorporated by reference.

U.S. Provisional Application No. 61/488,828, filed May 23, 2011, entitled NANOWIRE PREPARATION METH- ODS, COMPOSITIONS, AND ARTICLES, is hereby incorporated by reference in its entirety.

Applicant has discovered that very thin silver nanowires, such as silver nanowires with thickness less than about 60 nm, can be prepared from silver seeds in the presence of potassium bromide. The thickness of the silver wires may be controlled to be as thin as about 30 nm, while being as long as about 40 micrometers.

Silver seeds may be produced by known methods, such as, for example, the method of P. Y. Silvert et al., *J. Mater. Chem.*, 1996, 6, 573-577, and P. Y. Silvert et al., *J. Mater. Chem.*, 1997, 7, 293-299, both of which are hereby incorporated by reference in their entirety. Silver seeds produced according to the method of Silvert have been characterized by transmission electron microscopy (TEM) and found to be predominately multiple twinned particles (MTPs). While not wishing to be bound by theory, such MTPs may influence the shape of the final nanowire product. See, for example, B. Wiley et al., *Chem. Eur. J.*, 2005, 11, 454-463, and Y. Sun et al., *Nano Letters*, 2003, 3, 955-960, both of which are hereby incorporated by reference in their entirety. In at least some embodiments, silver nanowires are produced in the presence of silver seeds comprising at least about 50% MTPs, such as, for example, at least about 75% MTPs.

A silver seed dispersion may, for example, be prepared by adding silver nitrate to a solution of polyvinylpyrrolidone in ethylene glycol, and heating with mixing to 100-120° C. After formation of the silver seeds, the reaction may be stopped by quenching in an ice bath.

Silver nanowire production is typically carried out in the presence of metal chlorides, such as chlorides of iron (II), iron (III), copper (I), copper (III), and the like. Without wishing to be bound by theory, such metal chlorides may help to stabilize silver seeds and prevent agglomeration. See, for example, B. Wiley et al., *Nano Letters*, 2004, 4, 1733-1739, which is hereby incorporated by reference in its entirety. Applicant has discovered that by using at least one compound capable of forming at least one bromide ion, thinner wires are able to be produced. In some cases, the at least one compound capable of forming at least one bromide ion may be used in place of the metal chlorides. In other cases, the at least one compound capable of forming at least one bromide ion may be used in addition to one or more compounds capable of forming at least one chloride ion, such as, for example, one or more metal chlorides. The at least one compound capable of forming at least one bromide ion may, for example, comprise at least one element from IUPAC Group one, such as potassium. One example of the at least one compound capable of forming at least one bromide ion is potassium bromide.

Silver nanowires may, for example, be prepared by adding a silver seed dispersion and silver nitrate to a nitrogen purged and blanketed 170° C. solution of potassium bromide and polyvinylpyrrolidone in ethylene glycol. The nanowire product may, for example, be collected after 3 hrs.

These methods are also believed to be applicable to reducible metal cations other than silver cations, including, for example reducible cations of other IUPAC Group 11 elements, reducible cations of other coinage metals, and the like. These methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

Exemplary Embodiments

U.S. Provisional Application No. 61/488,828, filed May 23, 2011, entitled NANOWIRE PREPARATION METHODS, COMPOSITIONS, AND ARTICLES, which is hereby incorporated by reference in its entirety, disclosed the following 19 non-limiting exemplary embodiments:

A. A method comprising:
  providing at least one first composition comprising at least one first reducible metal ion; and
  reducing the at least one first metal ion to at least one first metal in the presence of at least one second composition comprising seed particles and at least one compound capable of forming at least one bromide ion,
  wherein at least about 75 percent of the seed particles are multiply-twinned.

B. The method according to embodiment A, wherein the at least one first reducible metal ion comprises at least one coinage metal ion.

C. The method according to embodiment A, wherein the at least one first reducible metal ion comprises at least one ion from IUPAC Group 11.

D. The method according to embodiment A, wherein the at least one first reducible metal ion comprises at least one ion of silver.

E. The method according to embodiment A, wherein the at least one first composition comprises silver nitrate.

F. The method according to embodiment A, wherein the at least one second composition comprises at least one coinage metal or coinage metal ion.

G. The method according to embodiment A, wherein the at least one second composition comprises at least one element from IUPAC Group 11.

H. The method according to embodiment A, wherein the at least one second composition comprises silver or at least one ion of silver.

J. The method according to embodiment A, wherein the at least one compound comprises at least one element from IUPAC Group 1.

K. The method according to embodiment A, wherein the at least one compound comprises at least one potassium atom.

L. The method according to embodiment A, wherein the at least one compound comprises potassium bromide.

M. The at least one first metal product produced according to the method of embodiment A.

N. The at least one first metal product according to embodiment M, comprising at least one metal nanowire.

P. The at least one first metal nanowire according to embodiment N, comprising a length greater than about 30 micrometers.

Q. The at least one first metal nanowire according to embodiment N, comprising a length of about 40 micrometers.

R. The at least one first metal nanowire according to embodiment N, comprising a width of less than about 40 nm.

S. The at least one first metal nanowire according to embodiment N, comprising a width of about 33 nanometers.

T. The at least one first metal nanowire according to embodiment N, comprising an aspect ratio greater than about 500.

U. The at least one first metal nanowire according to embodiment N, comprising an aspect ratio of about 1200.

EXAMPLES

Example 1

To a solution of 12 g of polyvinylpyrrolidone (PVP) (weight average molecular weight of 55,000 g/mol) in 150 ml of ethylene glycol (EG), 396.3 mg of silver nitrate was added at room temperature. The mixture was heated with stirring to 100-120° C. at a rate of one degree per minute. After silver seeds formed, the reaction was quenched by placing the flask containing the silver seed dispersion in an ice bath.

A 500 mL reaction flask containing 420 mL EG, 58.7 mg potassium bromide, and 9.96 g PVP was purged with nitrogen at room temperature using a TEFLON® fluoropolymer tube, while stirring at 100 rpm. A stock solution of 0.324 M silver nitrate in EG was also purged by bubbling nitrogen into the solution at room temperature. The reaction mixture was heated with stirring and purging to 170° C. Nitrogen purging of the reaction mixture was discontinued after 1 hr and nitrogen blanketing of the flask headspace commenced. The silver seed dispersion was added to the heated solution, followed immediately with addition of 62 mL of the 0.324 M silver nitrate solution through a TEFLON® fluoropolymer syringe pump over 45 minutes. The reaction mixture continued to be held at 170° C. for three hours, after which the reaction flask was cooled in an ice bath.

A scanning electron micrograph of the product, showing silver nanowires having an average diameter of 33±25 nm and an average length of 8.5±5.5 µm, based on measurement of 322 wires, is shown in FIG. 1. Note that the length of the largest wire in this sample was 41 µm and that 10% of the wires had lengths greater than 15 µm.

Figure 2:
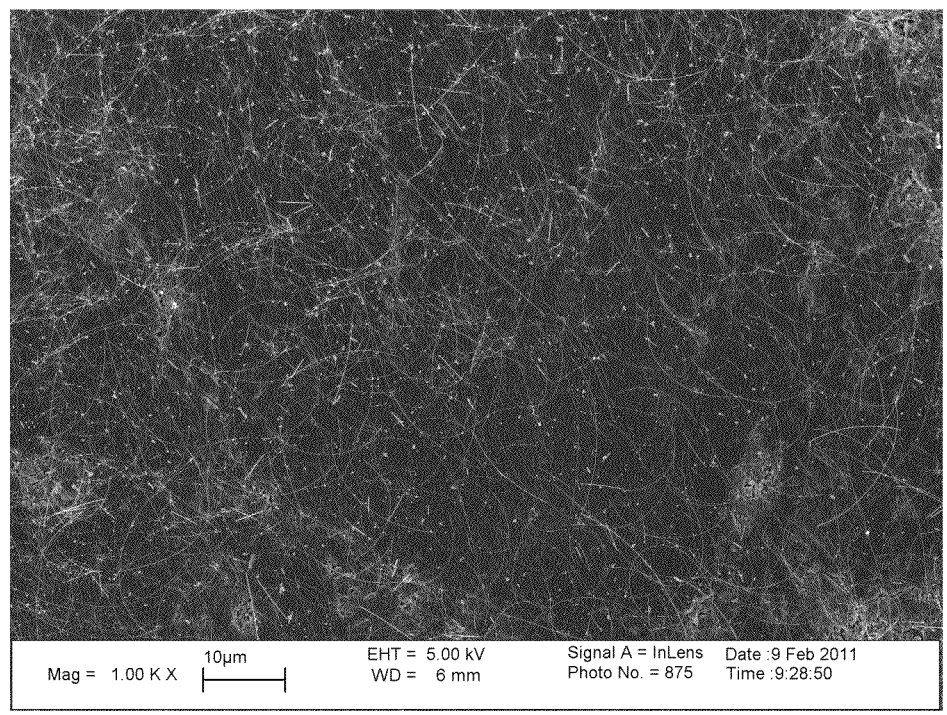
FIG. 2 shows a scanning electron micrograph of the product of Example 1.

Another scanning electron micrograph of the product, showing silver nanowires having a length of about 40 micrometers, is shown in FIG. 2.

Example 2

Comparative

A 500 mL reaction flask containing 300 mL EG, 10.0 g PVP, and 61.0 mg potassium bromide was heated to 170° C. while bubbling nitrogen through its contents using a TEFLON® fluoropolymer tube. After the flask's contents reached 170° C., bubbling was discontinued and the reaction flask headspace was instead blanketed with nitrogen. 60 mL of 0.324 M $AgNO_3$ in EG, which had been degassed by bubbling nitrogen through it, was then added to the reaction flask at a constant rate of 2.4 mL/min using a syringe pump. After addition of the $AgNO_3$ solution, the flask was held at temperature for 140 min, after which the reaction was quenched by immersing the flask in ice.

The reaction product was then washed with acetone and isopropanol, then centrifuged. The recovered product consisted primarily of nanoparticles, accompanied by short wires.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended embodiments, and all changes that come within the meaning and range of equivalents thereof are intended to be embraced therein.

What is claimed:

1. A method comprising:
   providing at least one composition comprising at least one seed particle and at least one compound capable of forming at least one bromide ion; and
   reducing at least one silver ion to at least one first metal nanowire in the presence of the at least one seed particle and in the presence of either the at least one compound or at least one bromide ion and in the presence of polyvinylpyrrolidone,
   wherein at least about 75 percent of the seed particles are multiply-twinned, and
   further wherein the at least one composition comprises at least one element from IUPAC Group 11, and
   further wherein the at least one first metal nanowire comprises a length greater than 30 micrometers and a width less than about 60 nm.

2. The method according to claim 1, wherein the reducing the at least one silver ion to the at least one first metal nanowire occurs in the presence of the at least one compound capable of forming the at least one bromide ion.

3. The method according to claim 1, wherein the at least one seed particle comprises at least one element from IUPAC Group 11.

4. The method according to claim 3, wherein the at least one seed particle comprises silver.

5. The method according to claim 1, wherein the at least one compound comprises at least one of an element from IUPAC Group 1.

6. The method according to claim 5, wherein the at least one compound comprises at least one potassium atom.

7. The method according to claim 6, wherein the at least one compound comprises potassium bromide.

* * * * *